Patented May 13, 1941

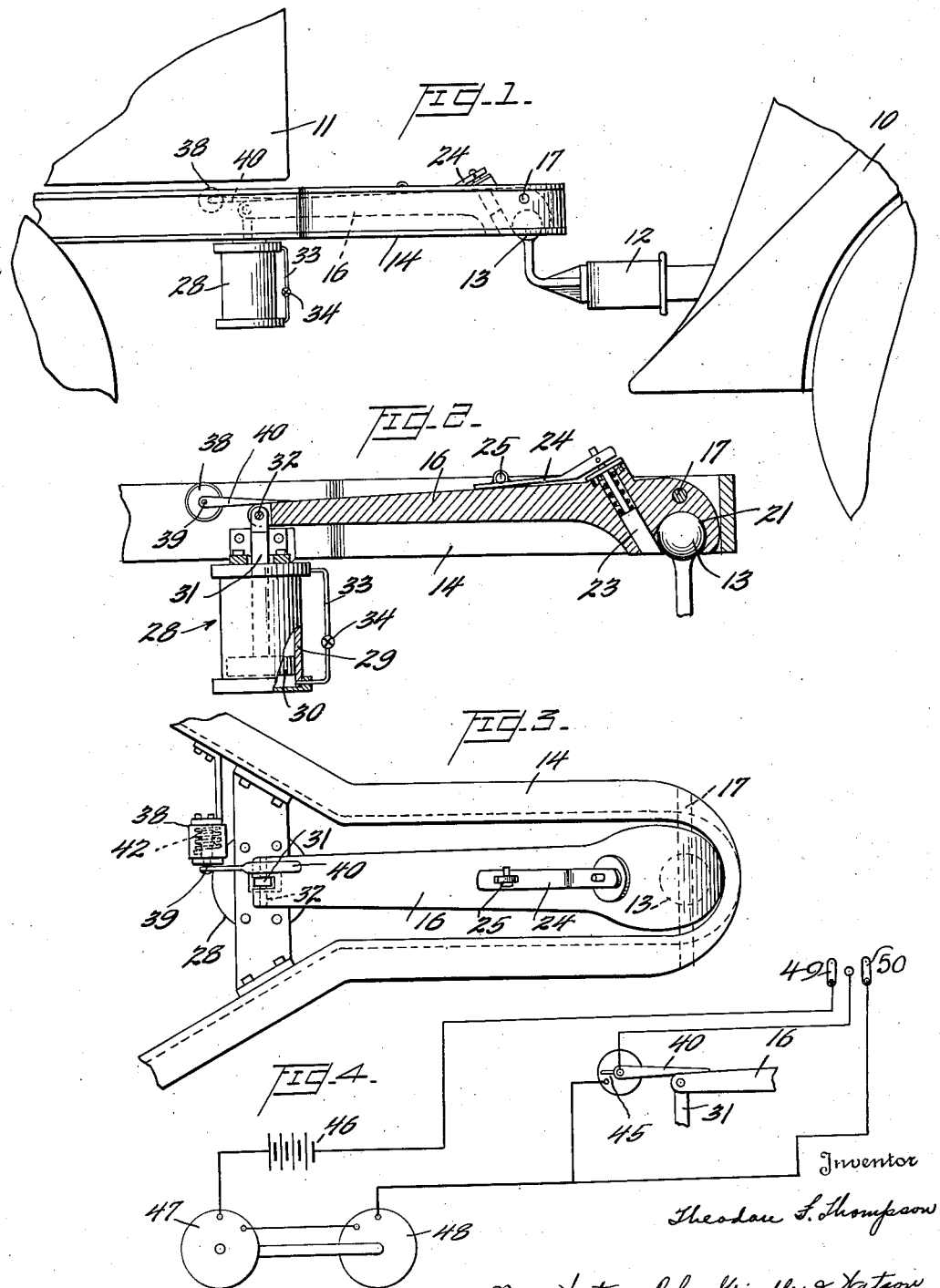

2,242,153

UNITED STATES PATENT OFFICE 2,242,153

BRAKE MECHANISM

Theodore F. Thompson, Des Moines, Iowa

Application May 4, 1939, Serial No. 271,761

3 Claims. (Cl. 188—112)

This invention relates to vehicles, especially of the class which is adapted to be formed into trains of conveyances for use on roads, and is primarily concerned with improvements in operating mechanism for the brakes of a trailing vehicle. It is an object of the invention to provide means whereby the brakes on the trailing vehicle may be effectively and automatically controlled in response to variation in draft conditions, so that the operator of a pulling vehicle need manipulate only the brakes of that vehicle in order to effect simultaneous application of the brakes of the trailing vehicle.

More specifically, it is an object of the invention to provide a brake control device for trailing vehicles which is inexpensive to construct, readily installed, and which may be associated with conventional types of trailer hitch, so that the advantages of the invention may be realized at little cost by a slight modification of the existing structure of any towing and trailing vehicle pair.

It is a feature of the invention that the device responds readily to a sustained change in the direction of the longitudinal force applied to the trailing vehicle by the towing vehicle, but is not affected by momentary and negligible variation in the direction of such force, or by relative movement in general of the towing and trailing vehicle such as occurs in driving over an irregular road bed.

It is a further object of the invention to provide, in combination with automatically operable control mechanism for the brakes of the trailing vehicle, means operable from within the towing vehicle for rendering such automatic control means ineffective, or for controlling the brakes in the trailing vehicle independently of such automatic means.

Further objects and features of the invention will be apparent from the following description taken in connection with the accompanying drawing in which:

Figure 1 is a side elevation of a device for coupling a towing and a trailing vehicle illustrating the application of the invention thereto;

Figure 2 is a vertical longitudinal sectional view of a portion of the structure shown in Figure 1;

Figure 3 is a plan view of the structure shown in Figure 2; and

Figure 4 is a diagrammatic representation of electrical connections suitable for use with the structure shown in Figures 1-3 inclusive.

In order to facilitate an understanding of the invention, reference is made herein to the preferred embodiment illustrated in the drawing and specific language is employed to describe the same. It will nevertheless be understood that no limitation of the scope of the invention is thereby intended, but that various modifications and alterations are contemplated such as would ordinarily be effected by those skilled in the art to which the invention relates.

Referring to Figure 1 of the drawing it will be observed that the invention is illustrated as applied to the draft coupling between a towing vehicle 10 and a trailing vehicle 11. Each vehicle is illustrated as provided with standard connecting parts, including a member 12 secured to the rear of the towing vehicle and provided with the usual spherical member 13, and a yoke member 14 secured to the towing vehicle and normally provided with a spherical socket to receive the member 13, whereby a universal joint connection is afforded between the two vehicles. In applying my invention to this type of coupling, I preferably provide an elongated arm 16 which is received within the yoke member 14 and is pivoted thereto as indicated at 17 for swinging movement about a generally horizontal axis. The spherical member 13 is received snugly within a corresponding spherical recess 21 in the forward end of the arm 16, and conventional means are employed to releasably retain these parts in cooperating relationship. This means may comprise a spring-pressed latch 23, normally urged into engagement with the lower side of the spherical member 13; an element 24, connected to the latch 23, may be pinned as at 25 to the arm 16 to prevent unintentional release of the latch.

It is important to note that the axis 17 of pivotal connection of the arm 16 with the yoke 14 is disposed directly above the axis of pivotal connection between the arm 16 and the member 12, namely the center of the spherical member 13. Thus any relative vertical movement between the vehicles 10 and 11 results in the application to the arm 16 of a generally vertical force through the pivotal axis 17, and there is no tendency to swing the arm 16 about the axis 17. If, on the other hand, relative movement of the vehicles in a horizontal longitudinal direction occurs, the force transmitted between the vehicles through the spherical member 13, will cause rocking movement of the arm 16 about the pivotal axis 17. If, for example, the brakes are applied to the towing vehicle while in motion, the resultant thrust on the spherical member 13 will tend to raise the rear end of the arm 16; if the towing vehicle is pulling, for example when proceeding up hill, the resultant force will tend to move the rearward end of the arm 16 downwardly. These movements of the arm 16, representing change in the direction of force applied through the coupling between the vehicles, are utilized to operate the brakes of the trailing vehicle in the manner hereinafter explained.

It is nevertheless desirable to avoid operation of the brakes on the trailing vehicle when such operation is not required, and it is therefore important to prevent swinging movement of the arm 16 except when such movement represents sustained transmission of force between the vehicles in one direction or the other. Thus it is highly undesirable to control the brakes of the trailing vehicle on the occurrence of momentary deceleration or acceleration of the movement of the towing vehicle, such as might be caused by passage of the vehicles over a rough road bed, momentary deceleration of the motor of the towing vehicle, and so on. It is therefore proposed to employ a device which prevents operation of the arm 16, and consequently of the brakes of the trailing vehicle, except in response to sustained transmission of force in one direction between the two vehicles.

This device may assume any suitable form; in the preferred form of the invention illustrated in the drawing, a frictional retarding device in the nature of a dashpot indicated generally at 28 is used. The dashpot may comprise a cylinder 29, mounted on the yoke member 14, filled with suitable fluid such as oil, a piston 30 reciprocable in the cylinder 29, and a piston rod 31 which is pivotally connected at 32 to the rear end of the arm 16. A fluid by-pass 33 preferably controlled by a valve 34, places the opposite ends of the cylinder 29 in communication, and the frictional resistance offered by a passage of fluid through this by-pass may thus be adjusted so as to afford adequate resistance to movement of the arm 16 as the result of transmission of momentary impulses between the vehicles, while permitting reasonably prompt displacement of the arm 16 from one position to the other on the occurrence of transmission between the vehicles of a sustained force.

It will be appreciated that the structure thus far described can readily be utilized to control the brakes of the trailing vehicle by the establishment of suitable mechanical, fluid, or electrical connections between the arm 16 and the brakes, and that the advantages of such structure may be realized in any conventional towing and trailing vehicle pair, regardless of the type of brake with which the trailing vehicle is provided. However, I have found it convenient to represent my invention in its application to a trailing vehicle in which the brake is of the electrically operated type, the application of the brakes being effected by energization of an electrical circuit including a circuit closing switch and a source of electrical energy such as a battery. This type of brake operating mechanism is conventional and the details thereof form no part of the instant invention except to the extent that the controlling circuit is modified so as to respond to the movement of the arm 16.

Thus the circuit closing switch may be mounted in a cylindrical housing 38 which is secured to the yoke 14, the moving element of the switch being being carried by a shaft 39 rotatably mounted in the housing 38 and provided externally with an arm 40, the latter bearing at its free end on the upper side of the rear end of the arm 16. A coil spring 42, also mounted within the housing 38, acts between the latter and the shaft 39 to rotate the shaft and the arm 40 in a clockwise direction as viewed in Figure 2, the spring 42 being sufficiently strong, in the absence of transmission of force between the vehicles, to depress the arm 16 to the position in which it is shown in Figure 2. The switch, shown diagrammatically at 45 in Figure 4, is arranged to be closed when the arms 16 and 40 swing upwardly, for example when the brakes of the towing vehicle are applied while in motion. It is therefore apparent that the switch 45 may be incorporated in the circuit arranged to energize electrical brakes, or otherwise to apply mechanically operated brakes, of the trailing vehicle.

As shown in Figure 4, the switch 45 may be arranged in series in a circuit including a source of electrical energy 46 such as a battery, and conventional local brake energizing mechanism represented diagrammatically at 47 and 48 and applied adjacent opposed wheels of the trailing vehicle.

The circuit represented in Figure 4 is preferably modified, in order to secure a further advantage of the invention, by the inclusion in the circuit of movable switches 49 and 50, which may be mounted in the towing vehicle for convenient manipulation by the driver. The switch 49 is arranged in series with the automatically operated switch 45; thus when the switch 49 is opened, the switch 45 and the automatic operating mechanism therefor are rendered inoperative, so that the vehicle pair may be driven rearwardly, for example to park the same without the application of the brakes of the trailing vehicle. The switch 50 is arranged in series with the automatically operated switch 45, and when closed energizes the brake applying means, so that the brakes on the trailing vehicle may be applied while the vehicles are standing and despite the fact that no force is then being transmitted therebetween. This arrangement affords the driver of the towing vehicle full control over the brakes under varying operating conditions, from the driver's seat, and at the same time affords all the advantages of automatic application of the brakes of the trailing vehicle when desired.

It will be observed that the illustrated construction is extremely simple so far as the mechanical parts of the coupling or hitch are concerned. The usual conventional universal joint, permitting proper freedom of movement between the two vehicles, affords one of the two pivotal axes required to effect proper operation of the arm 16 and the mechanism controlled thereby.

Having thus described the invention, what is claimed as new and desired to be secured by Letters Patent is:

1. In a trailer hitch, the combination with members adapted for attachment to a towing vehicle and a trailing vehicle respectively, of a third member having a pivotal connection with each of said first members, at least one of said pivotal connections comprising a universal joint, said pivotal connections having horizontal axes defining a common, substantially vertical plane, brake mechanism for said trailing vehicle, means connected with said third member for operating said brake mechanism on occurrence of relative displacement of said first named members longitudinally of said vehicles, and a dashpot connected to said third member for resisting relative longitudinal displacement of said first named members.

2. In a trailer hitch, the combination with members adapted for attachment to a towing vehicle and a trailing vehicle respectively, said trailing vehicle having electrically operated brake means, of a third member having a direct pivotal connection with each of said first members, at least one of said pivotal connections comprising a universal joint, said pivotal connections having horizontal axes defining a common, substantially vertical plane, and means operable by said third member on occurrence of relative displacement on said first named members longitudinally of said vehicles for automatically energizing and releasing said brake means.

3. In a trailer hitch, the combination with members adapted for attachment to a towing vehicle and a trailing vehicle respectively, said trailing vehicle having electrically operated brake means of a third member having a direct pivotal connection with each of said first members, at least one of said pivotal connections comprising a universal joint, said pivotal connections having horizontal axes defining a common, substantially vertical plane, means operable by said third member on occurrence of relative displacement on said first named members longitudinally of said vehicles for automatically energizing and releasing said brake means, and means operable from within said towing vehicle for energizing and releasing said brake means independently of said last named means.

THEODORE F. THOMPSON.